(12) United States Patent
Cymbal

(10) Patent No.: US 8,100,617 B2
(45) Date of Patent: Jan. 24, 2012

(54) FASTENER SYSTEM WITH FRANGIBLE MEMBER

(75) Inventor: William D. Cymbal, Freeland, MI (US)

(73) Assignee: Nexteer (Beijing) Technology Co., Ltd.

( * ) Notice: Subject to any disclaimer, the term of this patent is extended or adjusted under 35 U.S.C. 154(b) by 1038 days.

(21) Appl. No.: 12/009,749

(22) Filed: Jan. 22, 2008

(65) Prior Publication Data

US 2009/0185879 A1    Jul. 23, 2009

(51) Int. Cl.
F16B 39/12    (2006.01)
F16B 31/00    (2006.01)
F16B 33/04    (2006.01)

(52) U.S. Cl. .............................. 411/222; 411/229; 411/2

(58) Field of Classification Search .................. 411/2, 3, 411/5, 222, 229, 230, 239, 242, 285, 286, 411/287, 288, 289, 290, 291, 931
See application file for complete search history.

(56) References Cited

U.S. PATENT DOCUMENTS

| | | | |
|---|---|---|---|
| 1,380,395 A * | 6/1921 | Korach | ............................. 411/3 |
| 1,449,683 A | 3/1923 | Lippold | |
| 2,142,819 A | 1/1939 | Olson | |
| 2,243,515 A | 5/1941 | Van Sant | |
| 2,285,080 A | 6/1942 | Berge | |
| 2,394,812 A * | 2/1946 | Seitz | ................................ 411/5 |
| 2,520,259 A | 8/1950 | Pummill | |
| 2,576,890 A | 11/1951 | Poupitch | |
| 3,030,996 A | 4/1962 | Doerr | |
| 3,512,447 A * | 5/1970 | Vaughn | .............................. 411/5 |
| 3,664,226 A * | 5/1972 | Gonzalez | ........................... 411/2 |
| 3,973,611 A | 8/1976 | Profit | |
| 4,729,703 A | 3/1988 | Sato | |
| 4,979,857 A | 12/1990 | Wing | |
| 5,865,581 A | 2/1999 | Sadri et al. | |
| 5,915,902 A | 6/1999 | Patterson et al. | |
| 6,109,848 A | 8/2000 | Werner | |
| 6,113,329 A | 9/2000 | Moroi et al. | |
| 6,467,807 B2 | 10/2002 | Ikeda et al. | |
| 6,659,504 B2 | 12/2003 | Riefe et al. | |
| 7,066,053 B2 | 6/2006 | Junkers | |
| 7,192,233 B2 | 3/2007 | Migita | |

* cited by examiner

Primary Examiner — Victor Batson
Assistant Examiner — James Cline, Jr.
(74) Attorney, Agent, or Firm — Cantor Colburn LLP

(57) ABSTRACT

A fastener system having a threaded shaft and a threaded body assembly. The threaded body assembly includes first and second bodies each having a threaded bore. A frangible member couples the two bodies together in an initial configuration. The two bodies are threaded onto the shaft in their initial configuration and, after one of the bodies has reached its final position on the shaft, the other body can be rotated relative to the one body and the threaded shaft thereby severing the frangible member and bringing engagement surfaces on the two bodies into bearing contact to inhibit loosening. The two bodies include recesses in their respective engagement surfaces. At least one of these recesses provides a space in which a stub of the frangible member is received when the two bodies are engaged together. The fastener system can be employed with the locking mechanism of an adjustable steering column assembly.

18 Claims, 3 Drawing Sheets

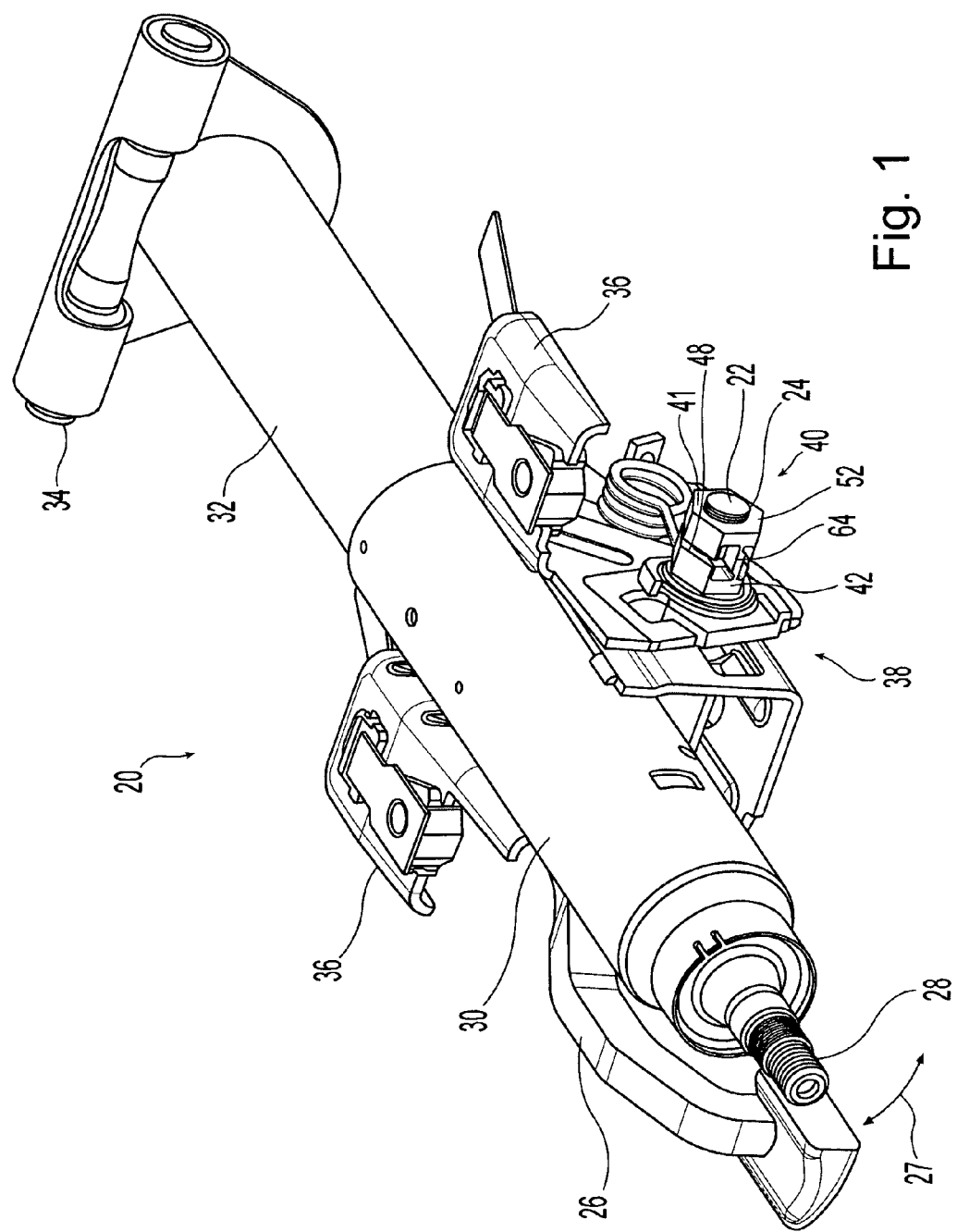

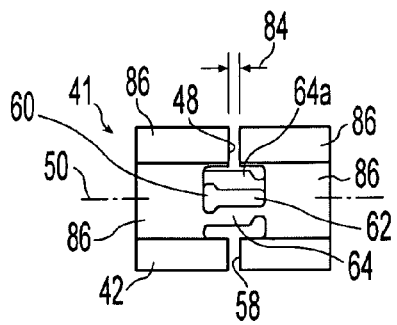 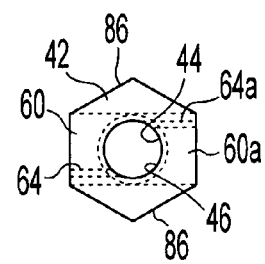 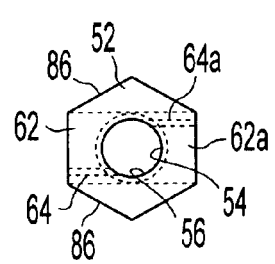
Fig. 2A  Fig. 2B  Fig. 2C
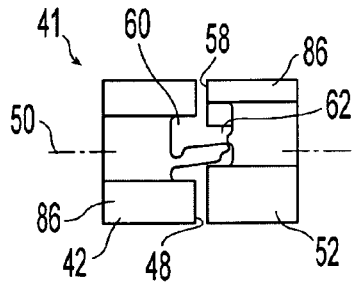 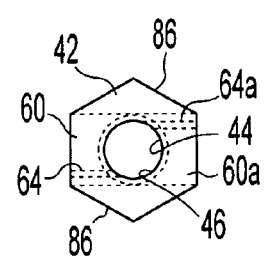 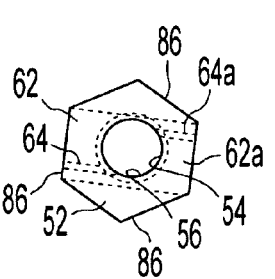
Fig. 3A  Fig. 3B  Fig. 3C
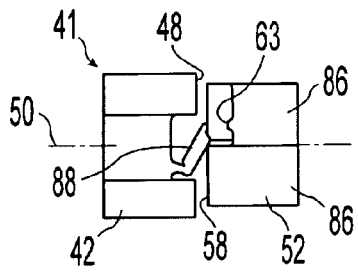 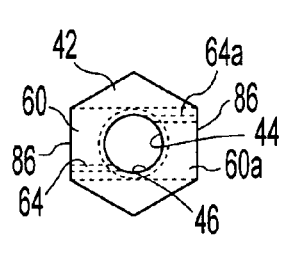 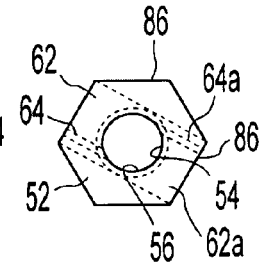
Fig. 4A  Fig. 4B  Fig. 4C
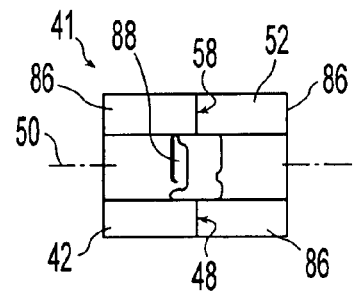 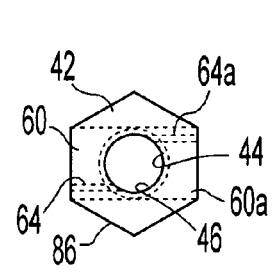 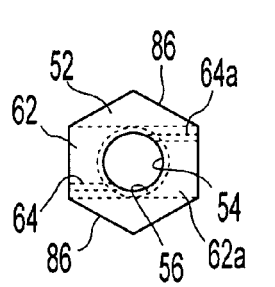
Fig. 5A  Fig. 5B  Fig. 5C

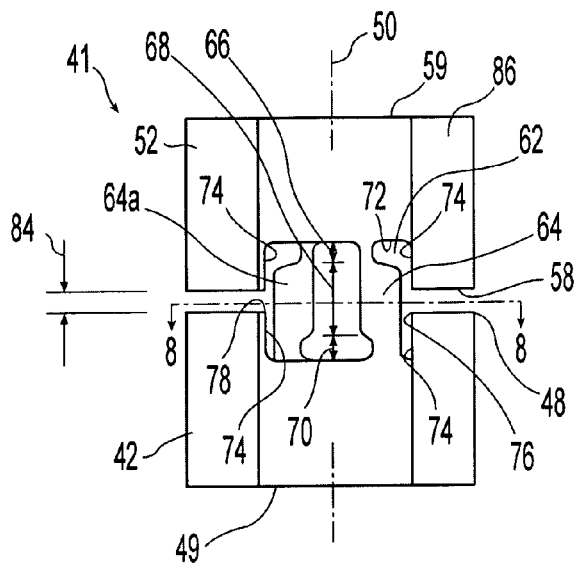
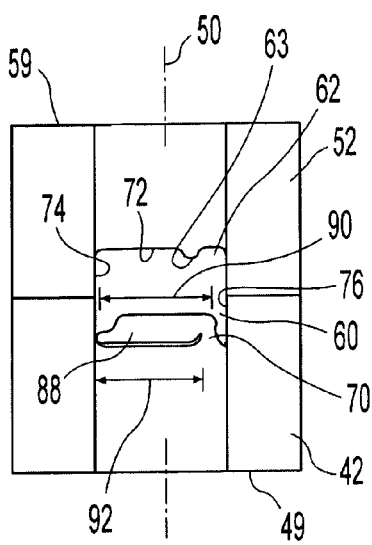
Fig. 6　　　Fig. 7
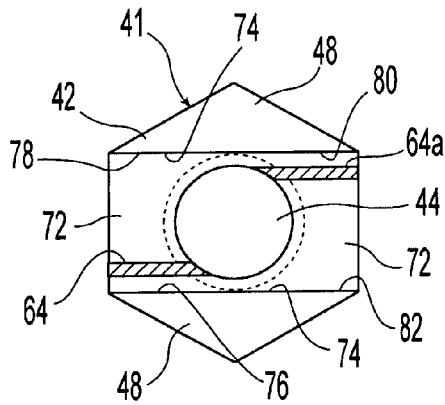
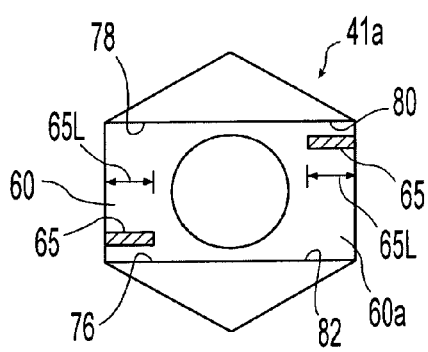
Fig. 8　　　Fig. 10
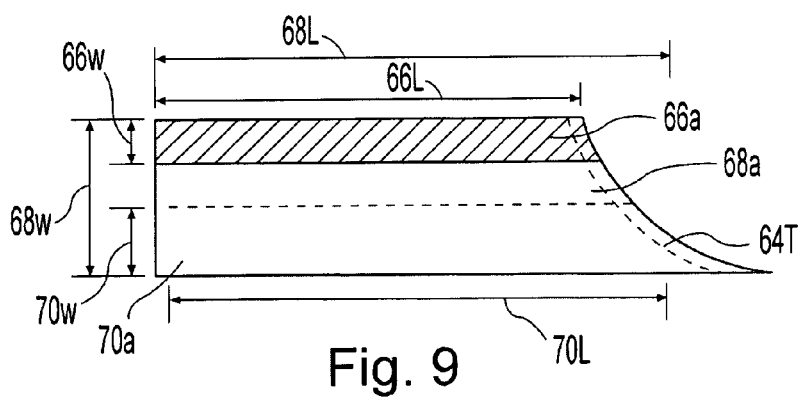
Fig. 9

FASTENER SYSTEM WITH FRANGIBLE MEMBER

BACKGROUND OF THE INVENTION

1. Field of the Invention

The present invention relates to the use of fasteners, such as a pair of nuts, on a threaded shaft wherein one of the nuts is a lock or jam nut that is used to prevent the loosening of the other nut.

2. Description of the Related Art

It is often necessary to place a nut on a threaded shaft in an apparatus where the threaded shaft is subjected to rotational or other forces that tend to loosen the nut. In such situations, it is well known to place two conventional nuts on the threaded shaft wherein one of the nuts functions as a lock nut or jam nut to prevent the loosening of the other nut. A variety of modifications to this arrangement have also been developed to provide an arrangement which inhibits the loosening of a primary nut on a threaded shaft.

There are a wide variety of applications for such locking nut arrangements. Many automobiles and other driver-operated vehicles have steering wheels that are mounted on adjustable steering columns wherein the steering column may be adjusted by tilting the steering column, adjusting the axial length of the steering column or by permitting both the tilting and axial adjustment of the steering column. Many of these adjustable steering columns have a locking lever that can be pivoted by the operator of the vehicle between an unlocked position, which allows for the repositioning of the steering column, and a locked position, which secures the steering column in the selected position. These levers are often mounted on one end of a threaded shaft that forms part of the locking assembly. The other end of the threaded shaft often has a nut threadingly secured thereon that bears against another part of the steering column assembly. To prevent this primary nut from loosening on the shaft and thereby degrading the performance of the locking assembly a jam nut can be installed on the threaded shaft and engaged with the primary nut.

While many of the known locking nut arrangements perform adequately, further improvements which facilitate the efficient manufacture of an apparatus employing a locking nut or jam nut arrangement is desired.

SUMMARY OF THE INVENTION

The present invention provides a fastener system having a first body with a threaded bore and a second body with a threaded bore and a frangible member coupling the two bodies together in an initial configuration. The two bodies can be threaded onto a threaded shaft as a single unit when they are in the initial configuration. After one of the bodies has reached its final position on the threaded shaft, the other body can be rotated relative to the one body and the threaded shaft thereby severing the frangible member and bringing engagement surfaces on the two bodies into bearing contact to inhibit loosening. The two bodies include recesses in their respective engagement surfaces. At least one of these recesses provides a space in which at least a portion of the stub of the frangible member can be received when the two bodies are engaged together.

The invention comprises, in one form thereof, a fastener system for use with a helically threaded cylindrical member. The fastener system includes a first body having a first threaded bore extending therethrough and defining an axis. The first body also has a first engagement surface disposed in a plane oriented substantially perpendicular to the axis and further defines a first recess in the first engagement surface. A second body has a second threaded bore extending therethrough and a second engagement surface disposed in a plane oriented substantially perpendicular to the axis. The second body further defines a second recess in the second engagement surface. There is also at least one frangible member coupling the first and second bodies together in an initial configuration. The frangible member is coupled to the first body within the first recess and is coupled to the second body within the second recess. The frangible member extends across an axial distance separating the first and second engagement surfaces. When the first and second bodies are in the initial configuration, the first and second threaded bores are positioned coaxially with the first engagement surface facing the second engagement surface and with the axial distance separating first and second engagement surfaces permitting the first and second threaded bores to be simultaneously threadingly engaged with the threaded cylindrical member whereby simultaneous rotation of the first and second bodies relative to the threaded cylindrical member axially repositions the first and second bodies on the threaded cylindrical member. Rotating one of the first and second bodies relative to both the threaded cylindrical member and the other of the first and second bodies severs the frangible member leaving a freely extending frangible member stub. Further relative rotation of the one body relative to both the threaded cylindrical member and other body brings the first and second engagement surfaces into bearing contact with the frangible member stub being disposed at least partially in at least one of the first and second recesses.

In some embodiments, the threaded cylindrical member may take the form of a helically threaded shaft that forms a part of an adjustable steering column assembly.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 1 is a perspective view of an adjustable steering column assembly in accordance with the present invention.

FIG. 2A is a schematic side view of a threaded body assembly in its initial configuration.

FIG. 2B is a schematic representation of the rotational position of one of the threaded bodies in FIG. 2A.

FIG. 2C is a schematic representation of the rotational position of the other threaded body in FIG. 2A.

FIG. 3A is a schematic side view showing the assembly of FIG. 2A after the two threaded bodies have been relatively rotated by approximately 15 degrees.

FIG. 3B is a schematic representation of the rotational position of one of the threaded bodies in FIG. 3A.

FIG. 3C is a schematic representation of the rotational position of the other threaded body in FIG. 3A.

FIG. 4A is a schematic side view showing the assembly of FIG. 2A after the two threaded bodies have been relatively rotated by approximately 30 degrees.

FIG. 4B is a schematic representation of the rotational position of one of the threaded bodies in FIG. 4A.

FIG. 4C is a schematic representation of the rotational position of the other threaded body in FIG. 4A.

FIG. 5A is a schematic side view showing the assembly of FIG. 2A after the two threaded bodies have been relatively rotated by approximately 360 degrees.

FIG. 5B is a schematic representation of the rotational position of one of the threaded bodies in FIG. 5A.

FIG. 5C is a schematic representation of the rotational position of the other threaded body in FIG. 5A.

FIG. 6 is an enlarged side view of a threaded body assembly in its initial configuration.

FIG. 7 is an enlarged side view of a threaded body assembly after it has been installed and the two threaded bodies have been relatively rotated to their final engaged position.

FIG. 8 is a cross sectional view taken along line 8-8 of FIG. 6.

FIG. 9 is an enlarged schematic cross sectional view of a frangible member.

FIG. 10 is a cross sectional view of an alternative threaded body assembly.

Corresponding reference characters indicate corresponding parts throughout the several views. Although the exemplification set out herein illustrates embodiments of the invention, in multiple forms, the embodiments disclosed below are not intended to be exhaustive or to be construed as limiting the scope of the invention to the precise forms disclosed.

DETAILED DESCRIPTION OF THE INVENTION

FIG. 1 illustrates an adjustable steering column assembly 20 having a fastener system 40 in accordance with the present invention. Adjustable steering column assembly 20 includes a steering shaft 28 extending through upper steering jacket 30 and lower steering jacket 32. A steering wheel (not shown) is mounted on the projecting end of steering shaft 28. Upper and lower steering jackets 30, 32 are telescopingly coupled to enable the axial length of steering column assembly 20 to be adjusted. Steering column assembly 20 is mounted to the vehicle structure with pivot mount 34 which defines a tilt axis about which steering column assembly 20 may be adjustably tilted. A mounting bracket 36 is attached to the vehicle structure and a locking system 38 operably couples steering column assembly 20 with mounting bracket 36.

Locking system 38 has a locked configuration and an unlocked configuration. When locking system 38 is in its locked configuration, steering column assembly 20 is secured in its tilt and axial positions. When locking system 38 is in its unlocked configuration, steering column assembly 20 is released and its axial length and tilt position can be manually adjusted by the operator of the vehicle. The locking system includes a lever 26 which is coupled to an elongate cylindrical shaft 22 having helical threads 24 on its end opposite lever 26. Shaft 22 together with threaded body assembly 41 forms fastener system 40.

Lever arm 26 is mounted on shaft 22 and pivotal motion of lever arm 26, as schematically depicted by arrow 27, is used to shift locking system 38 between its locked and unlocked configurations. As discussed in greater detail below, threaded body assembly 41 provides both a primary threaded body 42 on shaft 22 and a secondary threaded body 52 that acts as a jam nut to prevent the loosening of primary threaded body 42. (Threaded body assembly 41 could alternatively be mounted on shaft 22 such that threaded body 52 acts as the primary nut and threaded body 42 acts as the jam nut.)

FIG. 1 illustrates fastener system 40 in a partially installed condition prior to severance of frangible member 64 and the bearing engagement of surfaces 48 and 58 located respectively on primary and secondary bodies 42 and 52. Except for the use of fastener system 40, steering column assembly 20 has a conventional design well-known to those having ordinary skill in the art. In this regard, it is further noted that fastener system 40 and other fastener systems in accordance with the present invention may be utilized with applications other than adjustable steering column assemblies and with steering column assemblies having alternative designs. For example, U.S. Pat. No. 6,659,504 B2 by Riefe et al. discloses a steering column having a rake bolt on which a fastener system 40 could be employed and the disclosure of U.S. Pat. No. 6,659,504 B2 is hereby incorporated herein by reference.

Assembly 41 may be formed by casting a metal material, e.g., aluminum. Secondary machining operations are then used with the casting to provide threaded body assembly 41. (Threaded body assembly 41 is also referred to herein as casting 41 but may also be formed using other manufacturing techniques.) Casting 41 includes two bodies 42, 52 which have coaxially located threaded bores 44, 54 and define axis 50. Threaded bores 44, 54 have helical threads 46, 56 which are engageable with helical threads found on conventional bolts and similar threaded shafts. Helical threads 46, 56 have the same pitch and thread design to enable threads 46 and 56 to both be engaged with the same threaded shaft.

Bodies 42, 52 each have an engagement surface 48, 58. Engagement surfaces 48, 58 are each disposed in a plane that is oriented substantially perpendicular to axis 50. In the initial configuration, threaded bodies 42, 52 are coupled together by frangible members 64 and 64a with engagement surfaces 48 and 58 facing each other and being spaced apart by an axial distance 84. Axial distance 84 and helical threads 46, 56 are coordinated so that when bodies 42, 52 are in the initial configuration, threaded bores 44, 54 can be simultaneously engaged with a single helically threaded cylindrical member, e.g., shaft 22, whereby simultaneous rotation of bodies 42, 52 relative to shaft 22 axially repositions casting 41 on shaft 22. In other words, casting 41 can be threaded onto shaft 22 when in the initial configuration in the same manner as a single threaded nut can be threaded onto a threaded bolt. To provide casting 41 with such threaded bores, threaded bores 44, 54 can be formed in a single machining operation as will be recognized by a person having ordinary skill in the art.

Each of bodies 42, 52 have a plurality of rotationally engageable flats 86 on the outer radial surface of bodies 42, 52. Flats 86 are advantageously positioned in a standard nut or bolt head configuration, e.g., a hexagonal shape of a standard size, so that flats 86 can be gripped by conventional tools, e.g., a wrench, when rotating casting 41 on a threaded shaft. First body 42 also includes a substantially planar surface 49 while second body 52 includes a substantially planar surface 59 both of which are oriented perpendicular to axis 50. Surfaces 49, 59 do not have any recesses or similar discontinuities and are located on the axial ends of casting 41 and can be rotated into engagement with another object in the same manner as the end surface on a conventional threaded nut is engaged with another object. Threaded body 42 also includes a recess 60 formed in engagement surface 48 while threaded body 52 has a recess 62 formed in engagement surface 58. Frangible member 64 is integrally joined with body 42 within recess 60 on one end and is integrally joined with body 52 within recess 62 at its other end.

In the illustrated embodiment, casting 41 has a second frangible member 64a that is similarly coupled with body 42 at one end within a recess 60a formed in engagement surface 48 and is coupled with body 52 at its opposite end within a recess 62a formed in engagement surface 58. With reference to FIG. 6, frangible members 64, 64a each have a frangible zone 66, an intermediate zone 68 and a bending zone 70. Casting 41 can be installed on shaft 22 with either surface 49 or 59 facing lever 26. In the illustrated embodiment, surface 49 is shown facing lever 26 and casting 41 is rotated as a single unit onto shaft 22 until surface 49 is brought into bearing contact with components of steering column assembly 20 at the desired level of torque. FIG. 1 illustrates casting 41 at the point where surface 49 has been brought into contact and casting 41 is still in its initial configuration. FIGS. 2A, 2B and 2C also represent this point in the installation process.

Once casting 41 has been tightened to the desired level of torque, threaded body 42 is held stationary on shaft 22 and the rotation of threaded body 52 is continued until engagement surfaces 48 and 58 are brought into bearing contact. This rotation of threaded body 52 relative to shaft 22 and threaded body 42 severs frangible members 64, 64a at frangible zones 66 and captures frangible member stubs 88 within the pocket formed by recesses 60, 62. Threaded body 52 acts as a jam nut due to the engagement of surface 58 with surface 48 on threaded body 42 and thereby inhibits the loosening of threaded body 42 on shaft 22 due to the pivoting motion of lever arm 26 during normal operation of adjustable column assembly 20.

FIGS. 2A through 5C schematically depict the process in which threaded body 52 is rotated relative to threaded body 42 after casting 41 has been tightened to the desired level of torque. These figures are schematic in nature and have been simplified for purposes of clarity. For example, threaded shaft 22 has been omitted from FIGS. 2A through 5C for purposes of graphical clarity. Similarly, while both frangible members 64 and 64a are shown in FIG. 2A, only frangible member 64 has been shown in FIGS. 3A, 4A and 5A for purposes of graphical clarity.

FIGS. 2A, 3A, 4A and 5A are schematic side views of threaded body assembly 41 as it is progressively installed on threaded shaft 22. FIGS. 2B, 3B, 4B and 5B schematically represent the relative rotational position of primary threaded body 42 corresponding to FIGS. 2A, 3A, 4A and 5A respectively. Similarly, FIGS. 2C, 3C, 4C and 5C schematically represent the relative rotational position of secondary threaded body 52 corresponding to FIGS. 2A, 3A, 4A and 5A respectively.

FIGS. 2A, 2B and 2C represent the point at which threaded body 42 has reached its final installation position on shaft 22 and casting 41 is still in its initial configuration. FIGS. 3A, 3B and 3C represent the point at which threaded body 52 has been further rotated through an arc of approximately 15 degrees relative to threaded body 42 and shaft 22 (shaft 22 is not depicted in FIGS. 2A through 5C). Similarly, FIGS. 4A, 4B and 4C represent the point at which threaded body 52 has been rotated through an arc of approximately 30 degrees (from the point represented by FIGS. 2A-2C) and FIGS. 5A, 5B and 5C represent the point at which threaded body 52 has been rotated through an arc of approximately 360 degrees (from the point represented by FIGS. 2A-2C).

Axial distance 84 separating surfaces 48 and 58 in the initial configuration of casting 41 and the pitch of helical threads 46, 56 is coordinated so that after approximately 360 degrees of relative rotation, surfaces 48 and 58 are brought into bearing engagement. In the illustrated embodiment, distance 84 is approximately 1.0 mm when casting 41 is in its initial configuration and the threads are M6.times.1 threads. Thus, the pitch of the threads is approximately 1.0 mm. By providing the threads with of pitch of 1.0 mm and using the axial distance 84 of 1.0 mm, bearing surfaces 48, 58 will be brought into contact after threaded body 52 has been rotated through an angle of approximately 360 degrees relative to threaded body 42. Alternative embodiments can also be employed that bring the engagement surfaces of the threaded bodies into contact after relative rotation through a different angle of rotation.

As represented by the common position of threaded member 42 in FIGS. 2B, 3B, 4B and 5B, threaded member 42 remains stationary as threaded body 52 is rotated on shaft 22 and moves axially into contact with threaded member 42. As schematically depicted in FIGS. 3A, 4A and 5A, as threaded body 52 is rotated, frangible member 64 is severed at frangible zone 66 and bent over at bending zone 70 and is pushed into recess 60. Similarly, frangible member 64a is severed and bent over into recess 60a. Frangible members 64, 64a have cross sectional areas, taken through planes oriented perpendicular to axis 50, that vary over the axial extent of frangible members 64, 64a. This variance in cross sectional areas is used to control the axial location at which frangible members 64, 64a are severed and bent.

As can be seen in FIG. 6, frangible zone 66 has an axial extent that is located within recess 62, i.e., axially disposed between bottom surface 72 of recess 62 and engagement surface 58. Bending zone 70 has an axial extent that is located within recess 60, i.e., axially disposed between bottom surface 72 of recess 60 and engagement surface 48. Intermediate zone 68 advantageously has an axial extent that is at least as long as axial distance 84. In the illustrated embodiment, intermediate zone 68 is longer than distance 84 extending the full axial distance 84 separating engagement surfaces 48, 58 when casting 41 is in its initial configuration and slightly into both recesses 60 and 62.

The properties of the different axial zones differ and are configured to control where frangible members 64, 64a are severed and bent as the two threaded bodies 42, 52 are rotated relative to each other. In the illustrated embodiment, threaded body assembly 41 is a unitary metal casting and frangible members 64, 64a are formed out of the same material as threaded bodies 42, 52. As a result the material properties of frangible members 64, 64a are generally similar throughout their entire axial length. As depicted in FIG. 9, the property of frangible members 64, 64a which is altered is the cross sectional area.

FIG. 9 depicts a cross sectional view of frangible member 64 in a plane perpendicular to axis 50 taken through frangible zone 66. As can be seen in FIG. 9, the cross sectional area 66a of frangible member 64 in frangible zone 66 has an average length of 66L and a width of 66w. The cross sectional area 68a of frangible member 64 in intermediate zone 68 has an average length of 68L and a width of 68w. The cross sectional area 70a of frangible member 64 in bending zone 70 has an average length of 70L and a width of 70w. The cross sectional area 66a of frangible zone 66 is the smallest cross sectional area defined by frangible member 64 and will be the axial location at which frangible member 64 will be severed when relatively rotating threaded bodies 42, 52.

It is noted that in the embodiment depicted in FIG. 9, frangible member 64 has one edge that is threaded and engageable with shaft 22. Dashed line 64T represents the innermost extent of such threads. The reduction of the cross sectional area caused by these threads is relatively minor in comparison to the total amount of cross sectional areas 66a, 68a and 70a and does not alter which of these areas provides the greater resistance to severance and bending.

The severance of frangible member 64 at frangible zone 66 may leave a remnant part 63 of frangible member 64 within the recess in which frangible zone 66 is located. Because frangible zone 66 is fully disposed within recess 62, remnant part 63 will be wholly disposed within recess 62 and will not interfere with the relative rotation of bodies 42, 52 or engagement of surfaces 48, 58 as surfaces 48 and 58 are brought into engagement. The other portion of severed frangible member 64 forms a freely extending stub 88 that includes bending zone 70 and intermediate zone 72.

The cross sectional area 70a of bending zone 70 is greater than cross sectional area 66a but less than the cross sectional area 68a of intermediate zone 68 to thereby provide a location at which stub 88 is bent as threaded bodies 42, 52 are relatively rotated. As threaded bodies 42, 52 are relatively rotated, frangible members 64, 64a will initially be inclined as bending zone 70 and frangible zone 66 are circumferentially displaced. Frangible zone 66 will be severed when this inclination is no longer sufficient to account for the circumferential displacement. Stub 88 will then be positioned at an angle relative to axis 50. FIGS. 3A-3C schematically represent the point shortly after frangible zones 66 have been severed. The passage of the opposing engagement surface 58 over stub 88 will further bend bending zone 70 and bias stub 88 towards recess 60 as schematically depicted in FIGS. 4A-4C. Surface 58 will still be spaced from surface 48 when first passing over stub 88 and, thus, may not fully depress stub 88 into recess 60. Frangible member 64 and recess 60 are configured so that the linear stub distance 90 from bending zone 70 to frangible zone 66 is less than the circumferential distance 92 between bending zone 70 and trailing edge 78 of recess 60 to allowing stub 88 to be depressed into recess 60 as schematically depicted in FIGS. 5A-5C.

The threads of bodies 42, 52 can be either left-handed or right-handed threads and this, of course, will determine the relative rotational direction required to bring surfaces 48 and 58 into contact. As used herein, the leading edges 76, 80 of recesses 60, 60a in which bending zones 70, 70a are respectively located, are those edges that a particular point on the opposite threaded body 52 would pass over first before passing over the recess 60, 60a and then the trailing edge 78, 82 of the recess 60, 60a when threaded bodies 42, 52 are being relatively rotated to bring surfaces 48, 58 into contact.

With reference to FIG. 7, it can be seen that distance 92 from bending zone 70 to trailing edge 78 is greater than linear stub distance 90 of frangible member stub 88 from bending zone 70 to frangible zone 66 to thereby allow stub 88 to be disposed either wholly or partially within recess 60. Recess 62 is in communication with recess 60 when surfaces 48, 58 are brought into contact and, thus, a portion of stub 88 may project upwardly into recess 62 without interfering with the contact between surfaces 48, 58. In other embodiments, such communication between the recesses may not be present when the engagement surfaces of the threaded bodies are brought into contact and, in such embodiments, it may be desirable for stub 88 to be wholly contained within the recess in which bending zone 70 is located.

The desired circumferential length of the recess in which bending zone 70 is located is dependent in part by the axial distance 84 separating the threaded bodies because intermediate zone 68 of frangible member 64 will be at least as great as distance 84. To allow frangible stub 88 to be bent downwardly wholly within the recess containing bending zone 70 without the further deformation of frangible stub 88, the distance separating leading edge 76 and trailing edge 78 will need to be at least as great as axial distance 84 for a portion of the recess in which bending zone 70 is located. Other embodiments, however, where the recess has a more limited extent are also possible. For example, the freely extending end of stub 88 could be accommodated in a recess located in the opposite threaded member.

It is also noted that the position of frangible members 64, 64a relative to shaft 22 may require that an inner radial portion of bending zone 70 be deformed or severed and frangible stub 88 be displaced radially outwardly as it is bent downwardly into recess 60. An alternative embodiment is shown in FIG. 10 which is similar to the embodiment of FIGS. 1-9 but differs by having frangible members 65 that are spaced outwardly from threaded shaft 22 and have a shorter length 65L. As can be seen in FIG. 10, frangible members 65 are positioned such that they can be bent over into recesses 60, 60a towards trailing edges 78, 82 without contacting shaft 22.

Because frangible members 65 are not located on a radial line passing through axis 50, there may be some twisting or severance of bending zone 70 as the two threaded bodies are relatively rotated. In still other embodiments of the invention, frangible members having an axis of symmetry extending along a radially oriented line could be employed to avoid such twisting of the frangible member.

Various other embodiments of the present invention may employ other modifications to casting 41. For example, rather than modifying the magnitude of the cross sectional areas of the frangible members to create a frangible zone and a bending zone, the frangible member could be formed of differing materials having different properties to provide such zones. Alternatively, the radial distance from axis 50 of the frangible member could be manipulated to provide such zones. These alternatives, however, would increase the manufacturing complexity and costs of the fastener system.

It is further noted that frangible members 64 and 64a are circumferentially distributed about axis 50 equidistantly. This results in a rotationally balanced torque load when bodies 42, 52 are first relatively rotated and frangible members 64, 64a are severed. If additional frangible members are used it is advantageous that they be circumferentially distributed about the central axis substantially equidistantly to provide a balanced torque load. For example, if three frangible members were used, they would be equidistantly arranged at approximately 120 degrees intervals about axis 50. The torque load generated by the severance of the frangible members, however, is likely to be quite minimal and unbalanced arrangements of frangible members could also be employed. For example, an unbalanced design might be desirable if it could be manufactured more cost-effectively.

While this invention has been described as having an exemplary design, the present invention may be further modified within the spirit and scope of this disclosure. This application is therefore intended to cover any variations, uses, or adaptations of the invention using its general principles.

What is claimed is:

1. A threaded body assembly for use with a helically threaded cylindrical member, said assembly comprising:
    a first body defining a first threaded bore defining an axis and extending therethrough and having a first engagement surface disposed in a plane oriented substantially perpendicular to said axis, said first body further defining a first recess in said first engagement surface;
    a second body defining a second threaded bore extending therethrough and having a second engagement surface disposed in a plane oriented substantially perpendicular to said axis, said second body further defining a second recess in said second engagement surface;
    at least one frangible member coupling said first and second bodies together in an initial configuration with said frangible member being coupled to said first body within said first recess and being coupled to said second body within said second recess, said frangible member extending across an axial distance separating said first and second engagement surfaces, and wherein, when said first and second bodies are in said initial configuration, said first and second threaded bores are positioned coaxially with said first engagement surface facing said second engagement surface, said axial distance separating said first and second engagement surfaces permitting said first and second threaded bores to be simultaneously threadingly engaged with the threaded cylindrical member whereby simultaneous rotation of said first and second bodies relative to the threaded cylindrical member axially repositions said first and second bodies on the threaded cylindrical member;

wherein rotating one of said first and second bodies relative to both the threaded cylindrical member and the other of said first and second bodies severs said frangible member leaving a freely extending frangible member stub; further relative rotation of said one body relative to both the threaded cylindrical member and other body bringing said first and second engagement surfaces into bearing contact with said frangible member stub being disposed at least partially in at least one of said first and second recesses; and wherein said frangible member defines a frangible zone axially disposed within one of said first and second recesses, said frangible member defining a variable cross sectional area in cross sections oriented perpendicular to said axis, said frangible zone defining a first cross sectional area wherein said first cross sectional area is less than the cross sectional areas defined by said frangible member outside said frangible zone.

2. The assembly of claim 1 wherein said first and second recesses are in communication when said first and second engagement surfaces are brought into bearing contact.

3. The assembly of claim 1 wherein said frangible member further defines an axially extending intermediate zone extending through said axial distance separating said first and second engagement surfaces when said first and second bodies are in said initial configuration and a bending zone axially disposed within the other of said first and second recesses whereby said frangible zone and said bending zone are disposed in opposite recesses separated by said intermediate zone, said intermediate zone defining a second cross sectional area and said bending zone defining a third cross sectional area, said third cross sectional area being greater than said first cross sectional area and less than said second cross sectional area.

4. The assembly of claim 3 wherein said frangible member stub defines a linear stub distance between said bending zone and said frangible zone, said bending zone being disposed in said first recess at a position wherein a distance from said bending zone to a trailing edge of said first recess is greater than said linear stub distance.

5. The assembly of claim 4 wherein said first and second bodies and said at least one frangible member are a unitary metal casting when in said initial configuration.

6. The assembly of claim 5 wherein said first and second threaded bores define a common helical pitch and said axial distance separating said first and second bodies defines a pre-selected distance wherein relative rotation of one of said first and second bodies on the threaded cylindrical member through an angular distance of approximately 360 degrees brings said first and second engagement surfaces into bearing contact.

7. The assembly of claim 1 wherein said frangible member is spaced radially outwardly from the threaded cylindrical member when said first and second bodies are in said initial configuration and threadingly engaged with the threaded cylindrical member.

8. A threaded body assembly for use with a helically threaded cylindrical member, said assembly comprising:

a first body defining a first threaded bore defining an axis and extending therethrough and having a first engagement surface disposed in a plane oriented substantially perpendicular to said axis, said first body further defining a first recess in said first engagement surface;

a second body defining a second threaded bore extending therethrough and having a second engagement surface disposed in a plane oriented substantially perpendicular to said axis, said second body further defining a second recess in said second engagement surface;

at least one frangible member coupling said first and second bodies together in an initial configuration with said frangible member being coupled to said first body within said first recess and being coupled to said second body within said second recess, said frangible member extending across an axial distance separating said first and second engagement surfaces, and wherein, when said first and second bodies are in said initial configuration, said first and second threaded bores are positioned coaxially with said first engagement surface facing said second engagement surface, said axial distance separating said first and second engagement surfaces permitting said first and second threaded bores to be simultaneously threadingly engaged with the threaded cylindrical member whereby simultaneous rotation of said first and second bodies relative to the threaded cylindrical member axially repositions said first and second bodies on the threaded cylindrical member;

wherein rotating one of said first and second bodies relative to both the threaded cylindrical member and the other of said first and second bodies severs said frangible member leaving a freely extending frangible member stub; further relative rotation of said one body relative to both the threaded cylindrical member and other body bringing said first and second engagement surfaces into bearing contact with said frangible member stub being disposed at least partially in at least one of said first and second recesses; and wherein said first and second bodies and said at least one frangible member are a unitary metal casting when in said initial configuration.

9. The assembly of claim 8 wherein said at least one frangible member comprises at least two frangible members circumferentially distributed about said axis substantially equidistantly.

10. The assembly of claim 8 wherein at least a portion of said first and second recesses each define a circumferential length at least as great as said axial distance separating said first and second engagement surfaces.

11. A threaded body assembly for use with a helically threaded cylindrical member, said assembly comprising:

a first body defining a first threaded bore defining an axis and extending therethrough and having a first engagement surface disposed in a plane oriented substantially perpendicular to said axis, said first body further defining a first recess in said first engagement surface;

a second body defining a second threaded bore extending therethrough and having a second engagement surface disposed in a plane oriented substantially perpendicular to said axis, said second body further defining a second recess in said second engagement surface;

at least one frangible member coupling said first and second bodies together in an initial configuration with said frangible member being coupled to said first body within said first recess and being coupled to said second body within said second recess, said frangible member extending across an axial distance separating said first and second engagement surfaces, and wherein, when said first and second bodies are in said initial configuration, said first and second threaded bores are positioned coaxially with said first engagement surface facing said second engagement surface said axial distance separating said first and second engagement surfaces permitting said first and second threaded bores to be simultaneously threadingly engaged with the threaded cylindrical member whereby simultaneous rotation of said first and second bodies relative to the threaded cylindrical member axially repositions said first and second bodies on the threaded cylindrical member;

wherein rotating one of said first and second bodies relative to both the threaded cylindrical member and the other of said first and second bodies severs said frangible member leaving a freely extending frangible member stub; further relative rotation of said one body relative to both the threaded cylindrical member and other body bringing said first and second engagement surfaces into bearing contact with said frangible member stub being disposed at least partially in at least one of said first and second recesses; and wherein said first and second threaded bores define a common helical pitch and said axial distance separating said first and second bodies defines a pre-selected distance wherein relative rotation of one of said first and second bodies on the threaded cylindrical member through an angular distance of approximately 360 degrees brings said first and second engagement surfaces into bearing contact.

12. A threaded body assembly for use with a helically threaded cylindrical member, said assembly comprising:

a first body defining a first threaded bore defining an axis and extending therethrough and having a first engagement surface disposed in a plane oriented substantially perpendicular to said axis, said first body further defining a first recess in said first engagement surface;

a second body defining a second threaded bore extending therethrough and having a second engagement surface disposed in a plane oriented substantially perpendicular to said axis, said second body further defining a second recess in said second engagement surface;

at least one frangible member coupling said first and second bodies together in an initial configuration with said frangible member being coupled to said first body within said first recess and being coupled to said second body within said second recess, said frangible member extending across an axial distance separating said first and second engagement surfaces, and wherein, when said first and second bodies are in said initial configuration, said first and second threaded bores are positioned coaxially with said first engagement surface facing said second engagement surface, said axial distance separating said first and second engagement surfaces permitting said first and second threaded bores to be simultaneously threadingly engaged with the threaded cylindrical member whereby simultaneous rotation of said first and second bodies relative to the threaded cylindrical member axially repositions said first and second bodies on the threaded cylindrical member;

wherein rotating one of said first and second bodies relative to both the threaded cylindrical member and the other of said first and second bodies severs said frangible member leaving a freely extending frangible member stub; further relative rotation of said one body relative to both the threaded cylindrical member and other body bringing said first and second engagement surfaces into bearing contact with said frangible member stub being disposed at least partially in at least one of said first and second recesses, wherein at least a portion of said first and second recesses each define a circumferential length at least as great as said axial distance separating said first and second engagement surfaces;

wherein said frangible member defines a frangible zone axially disposed within said second recess and a bending zone axially disposed within said first recess, said frangible member being frangibly separated within said frangible zone and bent at said bending zone during relative rotation of said first and second bodies which brings said first and second engagement surfaces into bearing contact; and said frangible member stub defines a linear stub distance between said bending zone and said frangible zone, said bending zone being disposed in said first recess at a position wherein a distance from said bending zone to a trailing edge of said first recess is greater than said linear stub distance.

13. An adjustable steering column assembly, said assembly comprising:

a helically threaded cylindrical shaft;

a first body defining a first threaded bore defining an axis and extending therethrough and having a first engagement surface disposed in a plane oriented substantially perpendicular to said axis, said first body further defining a first recess in said first engagement surface;

a second body defining a second threaded bore extending therethrough and having a second engagement surface disposed in a plane oriented substantially perpendicular to said axis, said second body further defining a second recess in said second engagement surface;

at least one frangible member coupling said first and second bodies together in an initial configuration with said frangible member being coupled to said first body within said first recess and being coupled to said second body within said second recess, said frangible member extending across an axial distance separating said first and second engagement surfaces, and wherein, when said first and second bodies are in said initial configuration, said first and second threaded bores are positioned coaxially with said first engagement surface facing said second engagement surface, said axial distance separating said first and second engagement surfaces permitting said first and second threaded bores to be simultaneously threadingly engaged with said threaded shaft whereby simultaneous rotation of said first and second bodies relative to said threaded shaft axially repositions said first and second bodies on said threaded shaft;

wherein rotating one of said first and second bodies relative to both the threaded shaft and the other of said first and second bodies severs said frangible member leaving a freely extending frangible member stub; further relative rotation of said one body relative to both the threaded shaft and other body bringing said first and second engagement surfaces into bearing contact with said frangible member stub being disposed at least partially in at least one of said first and second recesses; and wherein said frangible member defines a frangible zone axially disposed within one of said first and second recesses, said frangible member defining a variable cross sectional area in cross sections oriented perpendicular to said axis, said frangible zone defining a first cross sectional area wherein said first cross sectional area is less than the cross sectional areas defined by said frangible member outside said frangible zone.

14. The assembly of claim 13 wherein said frangible member further defines an axially extending intermediate zone extending through said axial distance separating said first and second engagement surfaces when said first and second bodies are in said initial configuration and a bending zone axially disposed within the other of said first and second recesses whereby said frangible zone and said bending zone are disposed in opposite recesses separated by said intermediate zone, said intermediate zone defining a second cross sectional area and said bending zone defining a third cross sectional area, said third cross sectional area being greater than said first cross sectional area and less than said second cross sectional area.

15. The assembly of claim 14 wherein said frangible member stub defines a linear stub distance between said bending zone and said frangible zone, said bending zone being disposed in said first recess at a position wherein a distance from said bending zone to a trailing edge of said first recess is greater than said linear stub distance.

16. The assembly of claim 15 wherein said first and second bodies and said at least one frangible member are a unitary metal casting when in said initial configuration.

17. The assembly of claim 16 wherein said first and second threaded bores define a common helical pitch and said axial distance separating said first and second bodies defines a pre-selected distance wherein relative rotation of one of said first and second bodies on said threaded shaft through an angular distance of approximately 360 degrees brings said first and second engagement surfaces into bearing contact.

18. The assembly of claim 17 wherein said first and second recesses are in communication when said first and second engagement surfaces are brought into bearing contact.

* * * * *